Oct. 8, 1963  H. H. CHILTON ETAL  3,106,054
STALK CUTTER
Filed March 7, 1962  2 Sheets-Sheet 1

Herbert H. Chilton
Moir E. Chilton
INVENTORS

BY *[signatures]*
Attorneys

Oct. 8, 1963　　　H. H. CHILTON ETAL　　　3,106,054
STALK CUTTER

Filed March 7, 1962　　　　　　　　　　2 Sheets-Sheet 2

Herbert H. Chilton
Moir E. Chilton
INVENTORS

BY

United States Patent Office 3,106,054
Patented Oct. 8, 1963

3,106,054
STALK CUTTER
Herbert H. Chilton and Moir E. Chilton, both of R.R. 1, Ararat, N.C.
Filed Mar. 7, 1962, Ser. No. 178,028
4 Claims. (Cl. 56—504)

This invention relates to cutting devices, and more particularly to a power operated cutter mounted on the rear of a tractor adapted to cut the stalks of plants.

Accordingly, it is a primary object of the invention to provide an improved stalk cutter which may be mounted on the rear of any conventional tractor.

It is another object of the invention to provide a stalk cutter particularly adapted for cutting the stalks of tobacco or corn that is so mounted on a tractor that the cutting elements of the cutter are laterally offset to one side of the tractor whereby the stalks are cut before they can be run over or trampled down by the wheels of the tractor.

It is yet another object of the invention to provide a stalk cutter adapted to be connected to the lift arms of conventional tractors so that the cutter may be power adjusted in elevation so as to cut the stalks at different heights.

It is still another object of the invention to provide a stalk cutter for tractors that is provided with a shield so as to prevent sap or gum from the cut stalks from soiling the tractor and its operator, and the shield further guides the stalks so as to keep them properly alined with the cutter elements.

It is yet another object of the invention to provide a cutter that is mounted on the rear of a tractor and driven by its power takeoff whereby the operation of the cutter may be stopped at any time merely by declutching the power takeoff from the engine of the tractor.

It is another object of the invention to provide a stalk cutter for tractors which is simple in design, economical to manufacture and maintain, and is reliable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
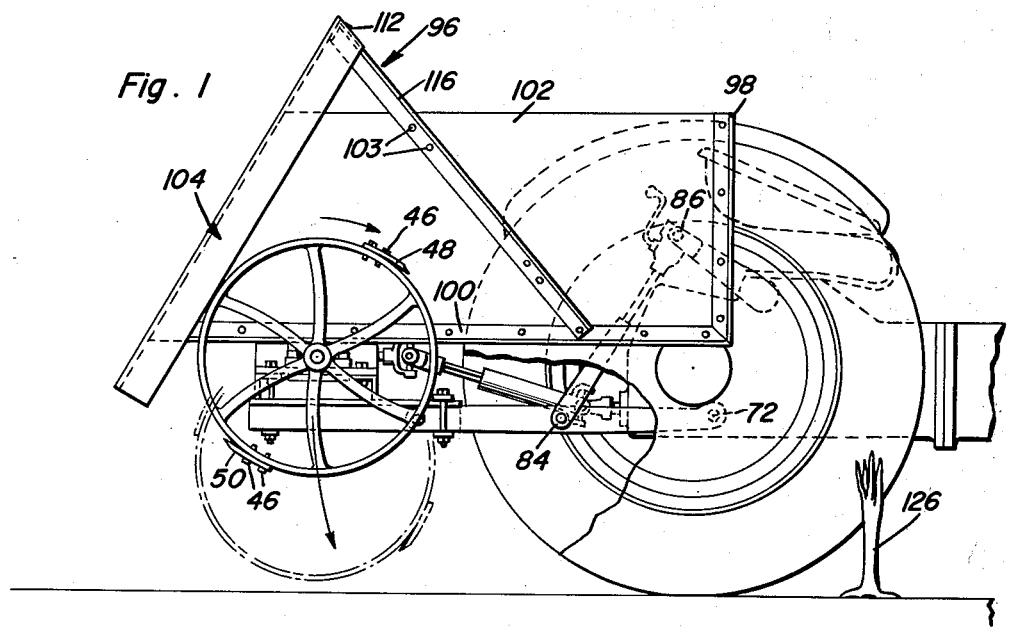
FIGURE 1 is a side elevational view with parts broken away showing the stalk cutter mounted on the rear end of a tractor.

Referring to the drawings, it can be seen that the stalk cutter 10 is mounted on the rear end of a conventional tractor 12.

The cutter 10 includes a rectangular frame 14 consisting of two parallel front and rear angle members 16 and 18 connected together at their ends by flat plates 20 and 22 which are secured to the angle members by means of nut and bolt assemblies 24.

The central portions of the angle members 16 and 18 are connected together by a rectangular hollow gear housing 26 which lies between the angle members and has integral flanges 28 and 30 removably secured to the angle members by means of nut and bolt assemblies 32. Opposite side walls of the housing 26 are provided with alined journals 34 which rotatably receive and support a cutter shaft 36 which extends beyond one end of the frame 14 and which has secured thereto a pair of spoked wheels 38 and 40. A journal assembly 42 is secured to the plate 22 by means of nut and bolt assemblies 44. The journal assembly 42 rotatably supports a central portion of the shaft 36.

A pair of rectangular plates having sharpened leading edges so as to comprise cutting blades extend between the rims of the wheels 38 and 40 and are secured thereto by means of studs 46. The blades 48 and 50 are on diametrically opposite sides of the wheels.

The housing 26 is also provided with a front journal 52 which rotatably supports a drive shaft 54 having a bevel gear 56 secured thereto within the housing. The shaft 36 also has a bevel gear 58 secured thereto within the housing which mates with the gear 56.

The stalk cutter 10 is pivotally supported and connected to the underside of the tractor frame or axle housing by means of a pair of arms 60 and 62 which converge together towards the tractor. Each arm is substantially identical and comprises an angle member 64 connected at one end to the angle members 16 and 18 by nut and bolt assemblies 66. Each arm further includes and extension 68 pivotally connected to the underside of the axle housing 70 by pivot pins 72. The members 64 and extensions 68 are connected together by a nut and bolt assembly 74 and a clamp comprising a pair of plates 76 on opposite sides of the member 64 and urged together by nut and bolt assemblies 78. The extensions 68 of each arm are pivotally connected to the power operated lift arms 80 of the tractor by means of links 82 and pivot pins 84 and 86.

The shaft 54 is drivingly connected to the power takeoff shaft 88 of the tractor by an extensible telescopic shaft 90 and a pair of universal joints 92 and 94.

A shield 96 is mounted on one end of the frame 14 so as to cover the cutter wheels 38 and 40. The shield includes a forwardly extending vertically mounted L-shaped angle frame comprising angle members 98 and 100 which are connected together at their ends and covered by a trapezoidal sheet or plate 102. The rear edge of the plate 102 slopes upwardly and forwardly and is connected to a rectangular bonnet 104 sloping in the same direction. The bonnet includes a rectangular sheet 106 connected at its edges to parallel angle members 108 and 110, and its top edge is connected to an angle member 112. The angle member 110 is connected by conventional means such as rivets or welds to the rear upwardly sloping edge of the sheet 102. The side of the angle member 108 is connected to a downwardly extending flange 114. An upwardly and rearwardly sloping angle member 116 is connected to the outer surface of the plate 102 and extends upwardly to the angle member 112 to which it is connected by conventional means. The angle member 116 is connected to the sheet 102 by means of rivets 103.

Figure 3:
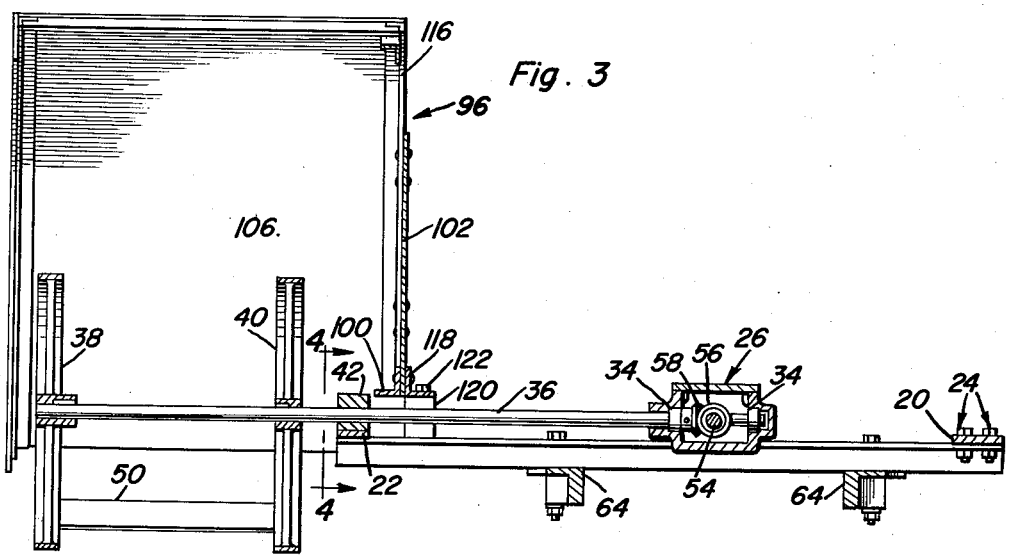
FIGURE 3 is an enlarged vertical cross-sectional view taken substantially through the axis of rotation of the cutter elements of the stalk cutter.
Figure 4:
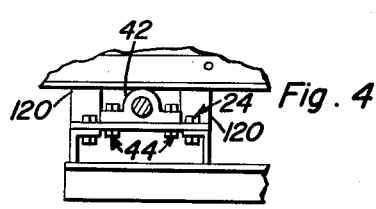
FIGURE 4 is a vertical cross-sectional view taken substantially on the plane of line 4—4 in FIGURE 3.
Figure 2:
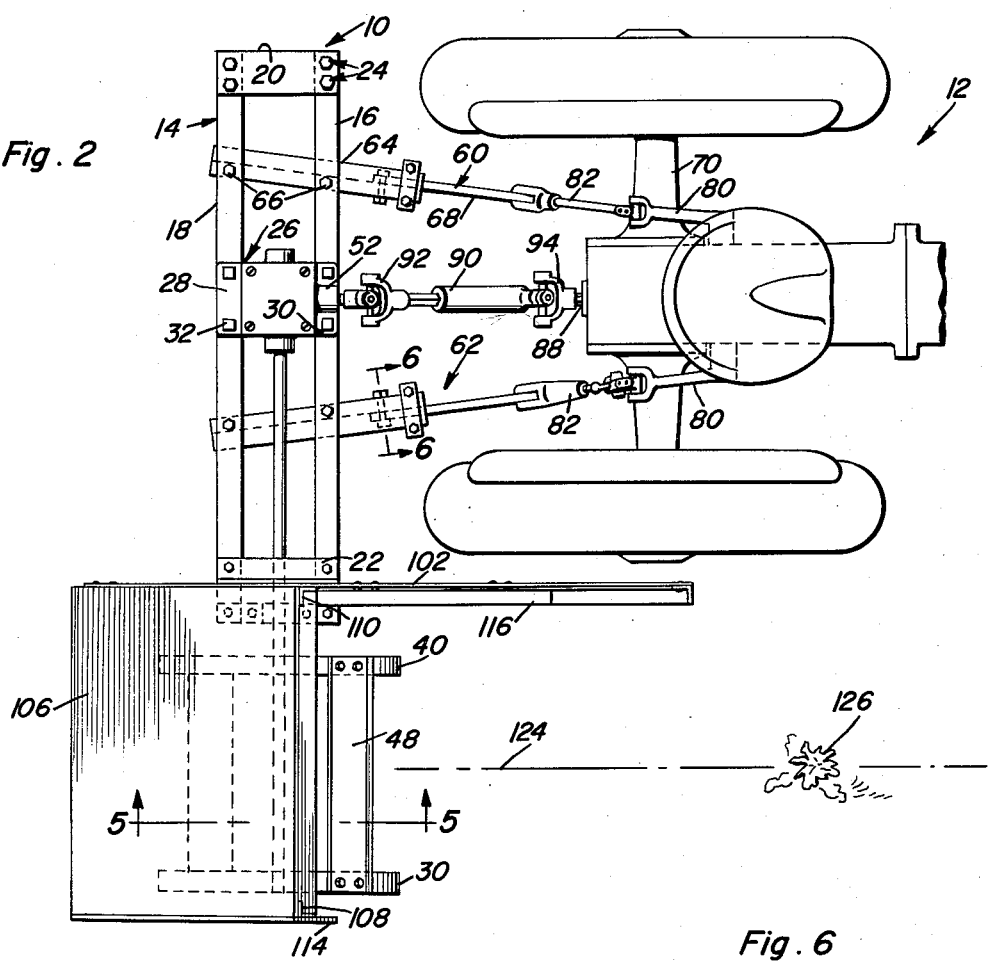
FIGURE 2 is a plan view of the device shown in FIGURE 1.
Figure 5:
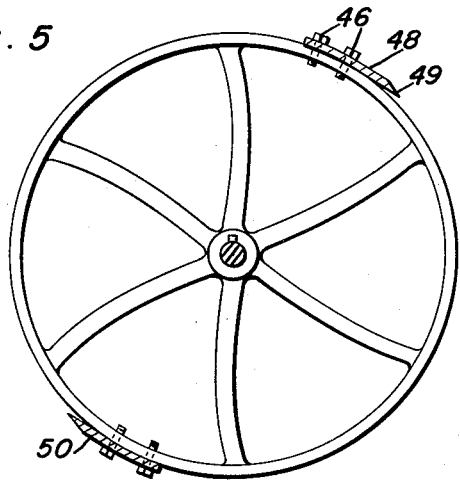
FIGURE 5 is a vertical enlarged cross-sectional view taken substantially on the plane of line 5—5 in FIGURE 2.
Figure 6:
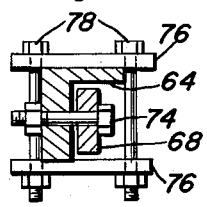
FIGURE 6 is an enlarged vertical cross-sectional view taken substantially on the plane of line 6—6 in FIGURE 2.

As shown in FIGURES 2 and 3, a short angle member 118 is connected to the angle members 16 and 18 of frame 14 by means of blocks 120 and stud 122. The angle member 100 is riveted to the angle member 118 and thereby secured to the frame 14.

As can be seen in FIGURE 2, the cutting blades 48 and 50 are laterally offset to one side of the tractor 12. Therefore, in chopping a row 124 of stalks 126, the tractor is driven to one side of the row but parallel thereto and the cutter blades 48 and 50 are adjusted to the proper elevation by means of the power lift arms 80 of the tractor. As the tractor is driven parallel to the row 124, the blades 48 and 50 are power driven by means of power takeoff shaft 88, shaft 90, differential joints 92, 94, gears 56 and 58, shaft 36, and wheels 38—40. The sharp edges 49 of the blades effectively cut the stalks and the shield 96 effectively protects the tractor and its driver from sap and gum coming from the stalks 126. This is particularly important when cutting tobacco since tobacco produces dark stains or gum which can badly stain and gum up the tractor and its driver. By properly adjusting the elevation of the stalk cutter as illustrated in dotted and solid lines in FIGURE 1, the stalks 126 may be cut at any desired point.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a tractor having a frame, a cutter frame pivotally and adjustably supported on a rear portion of said tractor frame and extending rearwardly therefrom, a power driven shaft extending laterally from said cutter frame, cutter supporting wheels fast on said shaft laterally of said frame and tractor, and having peripheral cutters thereon parallel to said shaft, the cutter frame being supported by the tractor frame by arm means pivotally connected to the tractor frame and links pivotally connected to the arm means at one end and adapted to be pivotally connected to power operated lift arms of the tractor at the other end.

2. The combination as defined in claim 1 wherein said power driven shaft is driven by a second shaft connected by transmission means to said power driven shaft, an extensible shaft connected to said second shaft by a first universal joint, a second universal connected to the other end of said extensible shaft and adapted to be connected to the power takeoff of the tractor.

3. The combination as defined in claim 1 wherein a shield is secured to one end of the cutter frame and includes a vertical plate mounted between the cutter wheels and the tractor and cutter frames.

4. A cutter as defined in claim 3 wherein said shield includes a sloping bonnet extending over the rear and top of said cutter wheels and peripheral cutter.

References Cited in the file of this patent

UNITED STATES PATENTS

| | | |
|---|---|---|
| 522,159 | Grimland | June 26, 1894 |
| 2,529,358 | Slater | Nov. 7, 1950 |
| 2,791,081 | Allen et al. | May 7, 1957 |
| 2,865,160 | Farwell | Dec. 23, 1958 |
| 2,908,127 | Craig | Oct. 13, 1959 |
| 2,974,472 | Gebhart | Mar. 14, 1961 |
| 3,028,919 | Smith et al. | Apr. 10, 1962 |